US009380430B2

(12) United States Patent
Vos et al.

(10) Patent No.: US 9,380,430 B2
(45) Date of Patent: *Jun. 28, 2016

(54) METHOD AND SYSTEM FOR WIRELESS COMMUNICATION WITH MACHINE-TO-MACHINE DEVICES

(71) Applicant: Sierra Wireless, Inc., Richmond (CA)

(72) Inventors: Gustav Gerald Vos, Surrey (CA); Jen T'ai Chitty, Surrey (CA); Andrew Hasley Watson Mitchell, North Vancouver (CA); Philippe Frédéric Joël René Guillemette, Vancouver (CA); Richard Thomas Kavanaugh, Encinitas, CA (US)

(73) Assignee: Sierra Wireless, Inc., Richmond, British Columbia (CA)

( * ) Notice: Subject to any disclaimer, the term of this patent is extended or adjusted under 35 U.S.C. 154(b) by 265 days.

This patent is subject to a terminal disclaimer.

(21) Appl. No.: 13/918,303

(22) Filed: Jun. 14, 2013

(65) Prior Publication Data

US 2013/0336111 A1 Dec. 19, 2013

Related U.S. Application Data

(60) Provisional application No. 61/659,838, filed on Jun. 14, 2012.

(51) Int. Cl.
*H04W 28/02* (2009.01)
*H04W 4/06* (2009.01)
(Continued)

(52) U.S. Cl.
CPC ............... *H04W 4/06* (2013.01); *H04L 41/08* (2013.01); *H04L 41/082* (2013.01); *H04L 67/34* (2013.01); *H04W 4/005* (2013.01); *H04W 28/10* (2013.01); *H04W 40/24* (2013.01)

(58) Field of Classification Search
CPC ........ H04W 4/06; H04W 4/005; H04W 28/10
See application file for complete search history.

(56) References Cited

U.S. PATENT DOCUMENTS 6,778,833 B1 8/2004 Fortuna
7,269,146 B2 9/2007 Pecen et al.
(Continued)

FOREIGN PATENT DOCUMENTS

| CA | 2626110 A1 | 4/2007 |
|---|---|---|
| GB | 2484342 A | 4/2012 |
| WO | WO-2011/152665 A2 | 12/2011 |

OTHER PUBLICATIONS

Supplementary European Search Report dated Feb. 12, 2015, for a related European Patent Application No. 12835534.4.

(Continued)

*Primary Examiner* — Jay P Patel
(74) *Attorney, Agent, or Firm* — Mintz Levin Cohn Ferris Glovsky and Popeo, P.C.

(57) ABSTRACT

Approaches for managing machine-to-machine (M2M) wireless devices are disclosed. M2M devices may be managed using broadcast messages wirelessly transmitted from a server. M2M wireless devices may be configured to utilize service classes in order to implement network access policy control. Features include per-message or per-group security; randomized delays for acknowledgements and/or network access, optionally per group or network access rule; sequence numbers and/or retransmissions for QoS; pre-defined pathname shortcuts; network access rules based on time, congestion and network events; estimates of congestion at various nodes; spreading and/or maximum wait times; default or universal service classes; application data streams mapped to service classes; and offline triggering.

32 Claims, 7 Drawing Sheets

(51) Int. Cl.
*H04W 28/10* (2009.01)
*H04W 4/00* (2009.01)
*H04L 29/08* (2006.01)
*H04L 12/24* (2006.01)
*H04W 40/24* (2009.01)

(56) References Cited

U.S. PATENT DOCUMENTS

| | | | |
|---|---|---|---|
| 7,426,203 | B1 | 9/2008 | McNamara et al. |
| 7,626,962 | B1 | 12/2009 | Zhang et al. |
| 7,738,421 | B2 | 6/2010 | McNamara et al. |
| 7,864,729 | B2 | 1/2011 | Zhang et al. |
| 7,965,682 | B2 | 6/2011 | McNamara et al. |
| 2001/0034753 | A1 | 10/2001 | Hildebrand et al. |
| 2004/0198279 | A1 | 10/2004 | Anttila et al. |
| 2005/0083961 | A1 | 4/2005 | Pecen et al. |
| 2006/0248578 | A1 | 11/2006 | Denton |
| 2007/0220279 | A1 | 9/2007 | Northcutt et al. |
| 2008/0020763 | A1 | 1/2008 | Fischer |
| 2008/0102749 | A1* | 5/2008 | Becker ............ 455/3.06 |
| 2010/0017463 | A1 | 1/2010 | Horn et al. |
| 2010/0062723 | A1 | 3/2010 | Tao et al. |
| 2011/0081883 | A1 | 4/2011 | Daly |
| 2011/0128911 | A1 | 6/2011 | Shaheen |
| 2011/0151898 | A1* | 6/2011 | Chandra et al. ......... 455/466 |
| 2011/0171923 | A1 | 7/2011 | Daly et al. |
| 2011/0201365 | A1* | 8/2011 | Segura ............ 455/466 |
| 2011/0274040 | A1* | 11/2011 | Pani et al. ............ 370/328 |
| 2012/0004003 | A1 | 1/2012 | Shaheen et al. |
| 2012/0030358 | A1 | 2/2012 | MacKenzie |
| 2012/0106391 | A1* | 5/2012 | van Loon et al. ......... 370/252 |
| 2012/0140677 | A1* | 6/2012 | Choi et al. ............ 370/254 |
| 2013/0083717 | A1 | 4/2013 | Vos et al. |
| 2013/0122906 | A1* | 5/2013 | Klatt ............ 455/435.1 |
| 2013/0315074 | A1* | 11/2013 | Kim et al. ............ 370/242 |
| 2013/0336111 | A1 | 12/2013 | Vos et al. |
| 2014/0098671 | A1 | 4/2014 | Raleigh et al. |
| 2014/0105009 | A1* | 4/2014 | Vos et al. ............ 370/230 |
| 2014/0314043 | A1* | 10/2014 | Kim et al. ............ 370/329 |
| 2014/0341109 | A1* | 11/2014 | Cartmell et al. ......... 370/328 |

OTHER PUBLICATIONS

United States Patent and Trademark Office ("USPTO") Office Action dated May 15, 2014, for related U.S. Appl. No. 13/628,588 (U.S. Publication No. 2013/0083717).

United States Patent and Trademark Office ("USPTO") Office Action dated Oct. 21, 2014, for related U.S. Appl. No. 13/628,588 (U.S. Publication No. 2013/0083717).

United States Patent and Trademark Office ("USPTO") Office Action dated May 7, 2015, for related U.S. Appl. No. 13/628,588 (MBM File:1679-206US) which was brought to the Examiner's attention in a previous IDS. (U.S. Publication No. 2013/0083717).

"One2many Introduces Machine-to-Machine Cell Broadcast". *BusinessWire*. Business Wire. Mar. 20, 2013. Web. Accessed Aug. 6, 2013.

"What is a Cell Broadcast." *Cell Broadcast Forum*. Web. Accessed Aug. 22, 2013.

3GPP. TS 23.041 v11.0.0 (Dec. 2010). Technical Specification. "3rd Generational Partnership Project; Technical Specification Group Core Network and Terminals; Technical realization of Cell Broadcast Service (CBS) (Release 11)." Dec. 2010.

Cell Broadcast System Factsheet "Muslim Prayer Service." Apr. 7, 2008.

Cell Broadcast System Factsheet "The SMS CB Function in Mobile Networks." Apr. 22, 2008.

Cell Broadcast System Whitepaper "Displaying CB Messages." Mar. 15, 2011.

Cell Broadcast System Whitepaper "Discovering CB Services." Dec. 8, 2010.

Cell Broadcast System Whitepaper "Languages in EU-Alert." Dec. 10, 2010.

Cell Broadcast System Whitepaper "Managing CB messages." Sep. 2, 2010.

Cell Broadcast System Whitepaper "Support of languages." Dec. 21, 2010.

ETSI TS 123 038 v10.0.0 (Mar. 2011). "Alphabets and language-specific information" (3GPP TS 23.038 version 10.0.0 Release 10) Mar. 2011.

ETSI TS 123 041 v10.0.0 (Apr. 2011). "Technical Realization of Cell Broadcast Service (CBS)" (3GPP TS 23.041 version 10.1.0 Release 10) Apr. 2011.

ETSI TS 123 042 v10.0.0 (Mar. 2011). "Compression algorithm for text messaging services" (3GPP TS 23.042 version 10.0.0 Release 10) Mar. 2011.

ETSI TS 148 049 v10.0.0 (Apr. 2011). "Cell Broadcast Service Protocol (CBSP)" (3GPP TS 48.049 version 10.0.0 Release 10) Apr. 2011.

Extended European Search Report dated Dec. 8, 2015, for related EP Patent Application No. 13804148.8.

Notice of Allowance dated Sep. 11, 2015, for related U.S. Appl. No. 13/628,588.

* cited by examiner

METHOD AND SYSTEM FOR WIRELESS COMMUNICATION WITH MACHINE-TO-MACHINE DEVICES

CROSS-REFERENCE TO RELATED APPLICATIONS

This application claims the benefit and priority of U.S. Provisional Application 61/659,838, filed Jun. 14, 2012. The foregoing application is incorporated by reference herein in its entirety.

FIELD OF THE TECHNOLOGY

The present technology pertains in general to wireless communication messaging and in particular to wireless communication with machine-to-machine devices.

BACKGROUND

Machine-to-Machine (M2M) devices are expected to be added to wireless networks in large numbers over the next few years. Their patterns of operation are typically different from the phones, smartphones and personal computing devices that currently dominate in terms of their proportion of use of the wireless networks. Many of the M2M terminals will operate for short periods of time, sending small amounts of data infrequently. Some will remain in one fixed location. In order to save power, M2M terminals may not be continuously registered on the network, which means that they may not be reachable by direct calling. In many cases however they will be listening to the base station and should be able to receive broadcast messages.

There is also a need to communicate with large numbers of M2M devices, often sending them the same information in order to manage and control them. However, because of the number of devices, present communication techniques may be problematic in their excessive use of network resources. In addition, M2M devices may not always be registered on the network, which gives rise to the technical challenge of how to address M2M devices that are not currently registered.

One way to make an M2M device available for calling is for it to wake up and register on the network periodically. However, this can be wasteful of battery power at the terminal and when large numbers of M2M devices connect and register, the traffic on the network will be substantial just for them checking to see if a there is a message waiting. Despite this the polling will be still be infrequent enough to delay communication with a terminal from the network.

Communicating with M2M devices on an individual basis uses a significant amount of network capacity and the signaling overhead is high relative to the small amount of payload data.

Therefore there is a need for a method and apparatus for wireless communication with machine-to-machine devices that is not subject to the above limitations.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and system for wireless communication with machine-to-machine devices. In accordance with an aspect of the present technology, there is provided a method for managing machine-to-machine (M2M) wireless devices from a remote server, the method comprising: configuring or controlling or configuring and controlling one or more M2M wireless devices at least in part using one or more broadcast messages transmitted over a wireless communication link.

In accordance with another aspect of the present technology, there is provided a system comprising a server and a plurality of machine-to-machine (M2M) wireless devices, wherein the server is communicatively coupled to the plurality of M2M wireless devices at least in part via a broadcast wireless communication link, and wherein the M2M wireless devices are configured or controlled, or configured and controlled via the broadcast wireless communication link.

In accordance with another aspect of the present technology, there is provided a method for managing access to a wireless network by a machine-to-machine (M2M) wireless device, the method comprising: defining a set of network access rules for potential use in governing network access operations performed by the M2M wireless device; defining a set of service classes, wherein each service class is associated with a particular subset of the set of network access rules; upon receiving a request by an application running on the M2M wireless device for accessing the wireless network, determining a service class associated with the application, and accessing the network in accordance with the determined service class and the subset of network access rules associated with the determined service class.

In accordance with another aspect of the present technology, there is provided a machine-to-machine (M2M) wireless device comprising: a memory comprising a set of network access rules for potential use in governing network access operations performed by the M2M wireless device, and a set of service classes, wherein each service class is associated with a particular subset of the set of network access rules; a network access module configured to: receive a request by an application running on the M2M wireless device for accessing the wireless network; determine a service class associated with the application; and access the network in accordance with the determined service class and the subset of network access rules associated with the determined service class.

In accordance with another aspect of the present technology, there is provided a computer program product configured for managing machine-to-machine (M2M) wireless devices from a remote server, the computer program product comprising code which, when loaded into memory and executed on an associated processor, is adapted to perform: configuring and controlling one or more M2M wireless devices at least in part using one or more broadcast messages transmitted over a wireless communication link.

In accordance with another aspect of the present technology, there is provided a computer program product configured for managing access to a wireless network by a machine-to-machine (M2M) wireless device, the computer program product comprising code which, when loaded into memory and executed on an associated processor, is adapted to perform: defining a set of network access rules for potential use in governing network access operations performed by the M2M wireless device; defining a set of service classes, wherein each service class is associated with a particular subset of the set of network access rules; upon receiving a request by an application running on the M2M wireless device for accessing the wireless network, determining a service class associated with the application, and accessing the network in accordance with the determined service class and the subset of network access rules associated with the determined service class.

BRIEF DESCRIPTION OF THE FIGURES

These and other features of the present technology will become more apparent in the following detailed description in which reference is made to the appended drawings.

DETAILED DESCRIPTION OF THE TECHNOLOGY

Definitions

Figure 1:
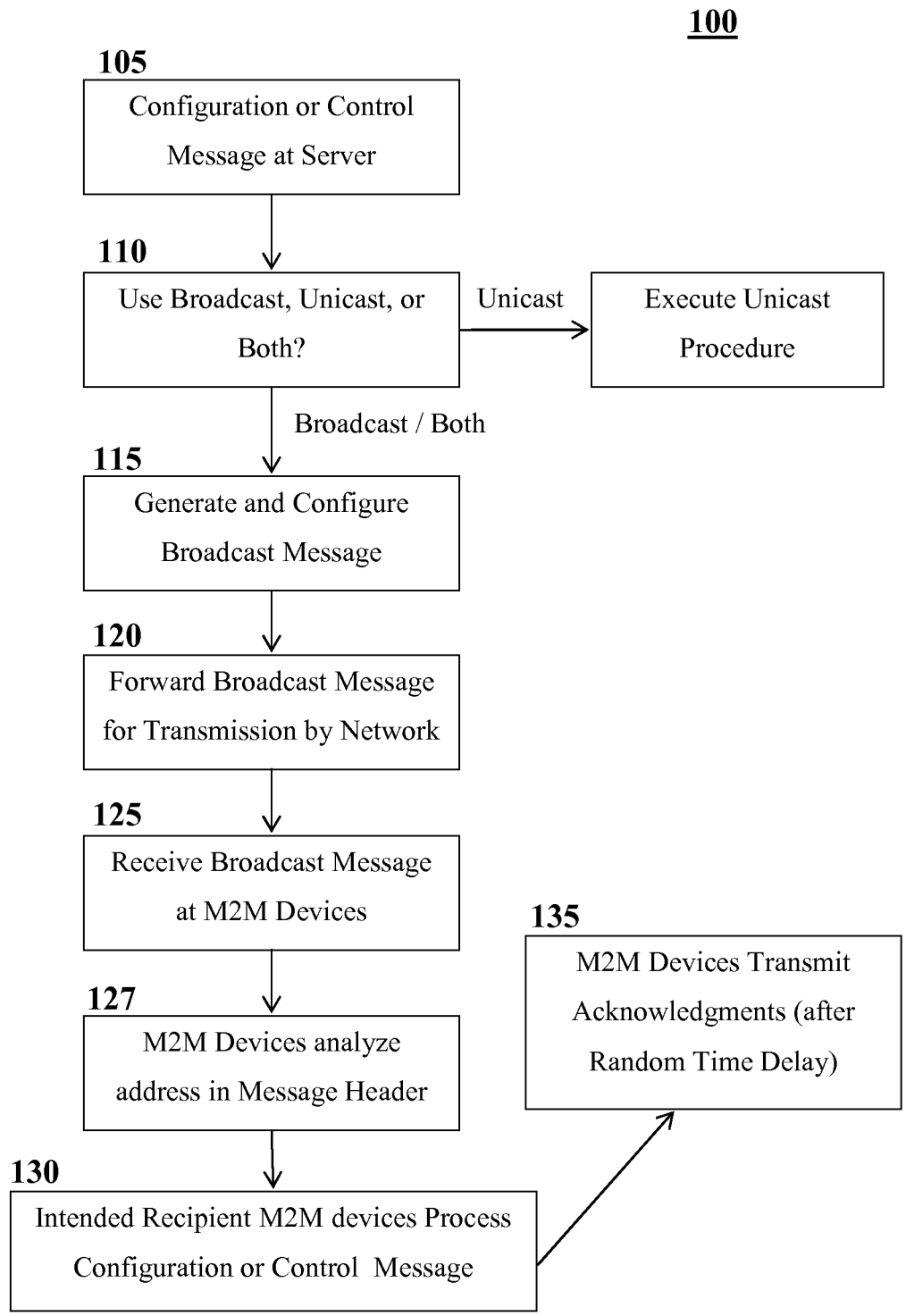
FIG. 1 illustrates a method for managing machine-to-machine (M2M) wireless devices, in accordance with embodiments of the present technology.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Embodiments of the present technology provide a means for controlling communication behaviours of M2M devices. A first mechanism provided in accordance with the present technology relates to broadcast device management, in which potentially multiple M2M devices may be configured or controlled or both configured and controlled via an available broadcast channel such as the Cell Broadcast channel. A second mechanism provided in accordance with the present technology relates to particular configurations of M2M device behaviours for desirable traffic management, and the like. The first and second mechanisms may be used together. For example, the M2M device behaviours may, when appropriate, be configured via broadcast device management. As another example, the M2M devices may be configured for appropriate interoperation with the broadcast channel. In various embodiments, an M2M device comprises a wireless modem and at least one application, such as an original equipment manufacturer (OEM) application.

Embodiments of the present technology are applied to facilitate secure and efficient machine-to-machine (M2M) communication. M2M communication may comprise automated communication between one or more relatively autonomous devices. For example, one or more remote metering or monitoring devices may periodically or intermittently transmit data, such as telemetry data, to a receiver, such as a server. The server may also periodically or intermittently transmit data, such as requests or updates, to the remote devices. M2M communication may be used to manage remote devices in a wide array of applications, as would be readily understood by a worker skilled in the art.

An M2M device may be connected to one or more servers, such as application servers, at least in part via a wireless network. Wireless networks may include cellular networks which may also be configured to service mobile phones, for example. Examples of such networks include GSM, UMTS and LTE networks, as well as related data transmission technologies such as EDGE and GPRS and the like as would be readily understood.

Embodiments of the technology provide a method for managing machine-to-machine (M2M) wireless devices from a remote server. The method comprises configuring, controlling, or configuring and controlling one or more M2M devices at least in part using one or more broadcast messages transmitted over a wireless communication link. The method may be implemented at least in part by a computer, such as a server, or a system of computing devices, such as servers, network infrastructure devices, and/or M2M devices.

Network infrastructure may include air interfaces, cellular base stations, node B's, radio network controllers, base station controllers, gateways, SGSNs, GGSNs, cell broadcast centres, and the like. In some embodiments, the network infrastructure facilitates communication without necessarily requiring customization in accordance with the present technology. In other embodiments, the network infrastructure may be configured to execute various functions specific to the present technology.

Embodiments of the present technology provide for broadcast message QoS, security, or both. The message QoS and/or security level may be adjustable based on current network conditions, time of day, network events, security requirements of the application layer, security requirements of an application operating on the application layer, security requirements of an application which operates in part on the M2M device, or the like, or a combination thereof. Such adjustment may result in an adjustment to downlink network traffic, uplink network traffic, message overhead, or the like, or a combination thereof. Examples of adjustments include the capability to adjust which proportion of broadcast messages trigger transmission of acknowledgements from M2M devices, how (possibly randomized) transmission of acknowledgements are spread over time, the frequency at which broadcast messages include new encryption nonces for use on subsequent messages, and the like.

FIG. 1 illustrates a method 100 provided in accordance with an embodiment of the present technology. A server generates or receives 105 a configuration or control message for communication to one or more groups of M2M devices. The server then determines 110 whether to transmit the message via broadcast, unicast, or a combination thereof. Unicast messages may be transmitted in accordance with existing methods, for example. If at least one broadcast message is to be transmitted, then the message is generated and configured 115. The configured broadcast message is then forwarded 120 for transmission over a broadcast channel. For example, the message may be sent as one or more packets for wireless transmission via a short message service-cell broadcast (SMS-CB) system associated with a cellular network. Various M2M devices receive 125 the broadcast message and analyze 127 the header to determine if the message is intended for them, for example by examining a group address field. Intended recipient M2M devices then process 130 the message and may transmit an acknowledgement 135 if configured to do so. Processing the message may comprise reconfiguration of the M2M device according to the configuration message, for example. In some embodiments, the broadcast message may be repeated two or more times, either unconditionally or conditional upon the number of acknowledgements received.

As used herein, a group of devices refers to a collection of devices such as M2M devices. In various embodiments, services may be conducted on a group, such as sending device triggers to all devices in a group, sending application data to all devices in a group, assigning monitoring policies to the devices in a group, and assigning network access policies to the devices in a group. Groups may be identified by a group address, for example. An M2M device may belong to one group or multiple groups.

Embodiments of the present technology provide a system comprising a server and a plurality of machine-to-machine (M2M) wireless devices. The server is communicatively coupled to the plurality of M2M devices at least in part via a broadcast wireless communication link. The M2M devices are configured, controlled, or configured and controlled via the broadcast wireless communication link.

Figure 2:
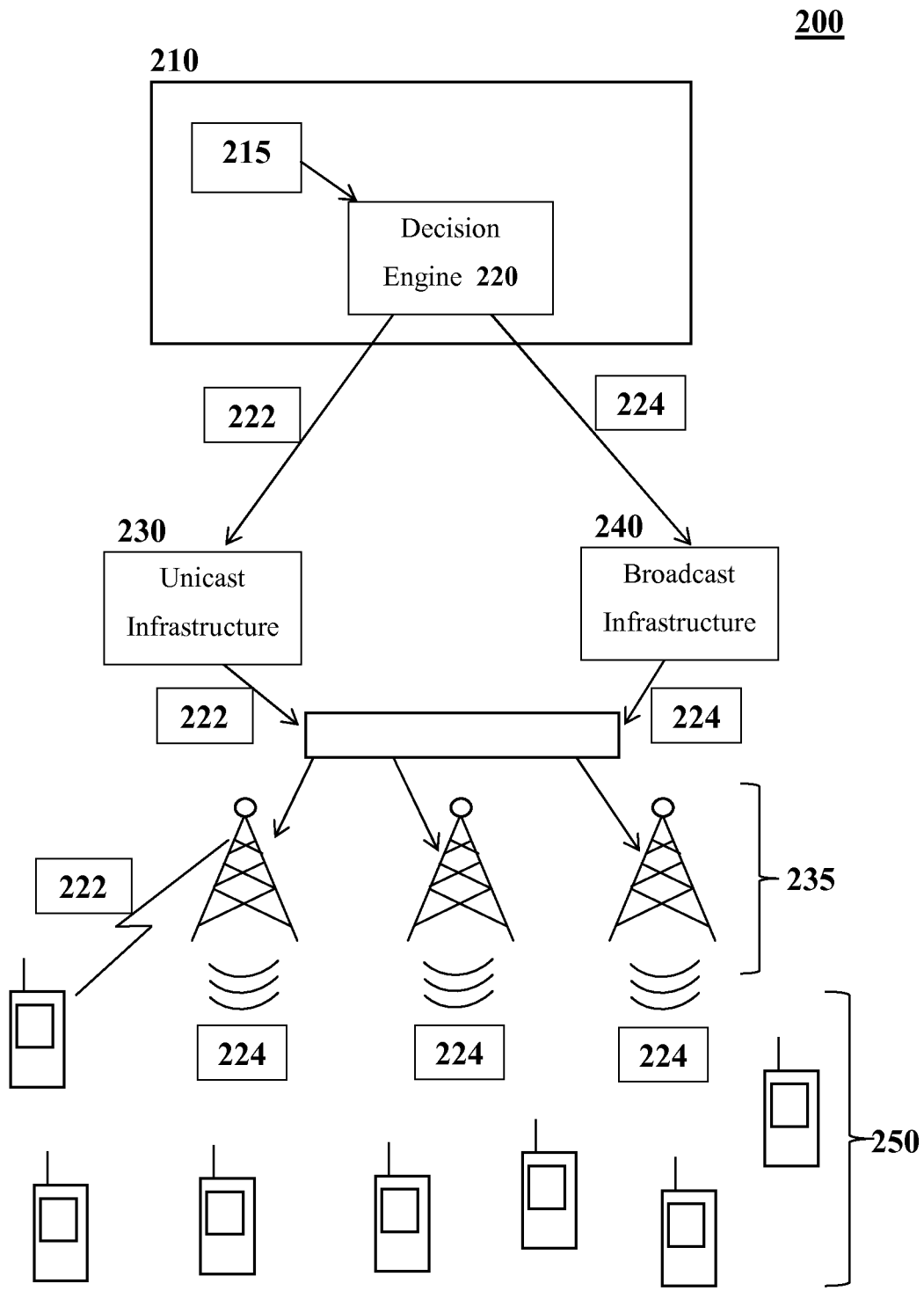
FIG. 2 illustrates a system for managing machine-to-machine (M2M) wireless devices, in accordance with embodiments of the present technology.

FIG. 2 illustrates a system 200 provided in accordance with embodiments of the present technology. The system comprises a server 210, such as an application server, with a message 215 to transmit to a group of M2M devices. As would be readily understood the server can be a single computing device or a collection of computing devices providing the desired functionality. The message may be a policy change message, for example. The server 210 comprises a decision engine 220 for determining whether to transmit the message via broadcast, unicast, or a combination thereof. Unicast messages 222 may be transmitted via existing unicast infrastructure 230, protocols and message delivery media. Unicast protocols and message delivery media may comprise open mobile alliance-device management (OMA-DM) protocols, IP packets, SMS messages, and the like. Unicast infrastructure may comprise OMA-DM infrastructure, SMS infrastructure, GPRS infrastructure, EDGE infrastructure, and the like. Broadcast messages 224 may be transmitted via broadcast infrastructure 240, a broadcast device management protocol, SMS-CB messages, and the like. Unicast and broadcast messages 222, 224 are transmitted wirelessly to M2M devices 250 via one or more base stations 235.

Broadcast Device Management

Broadcast device management relates in general to a means by which potentially large numbers of M2M devices may be configured and/or controlled from a source such as a base station or M2M server by utilizing broadcast channels to transmit configuration and/or control messages. In some embodiments, broadcast device management may be related to the transport layer of a standard protocol stack. Use of broadcast messages may avoid or alleviate the need for a large number of unicast messages addressed to individual devices, thereby providing for more efficient use of network resources.

Broadcast device management may make use of an existing Cell Broadcast Service (SMS-CB) which is part of the standards for 2G, 3G and 4G wireless networks. For example, for SMS-CB in 2G a defined and pre-allocated part of the base station transmissions is intended to be receivable by all suitably programmed mobile receivers. A feature of these transmissions is that the mobile receivers can receive and decode the broadcasted messages when powered on but not registered on the network (i.e. are offline). Currently the principal use of SMS-CB is for emergency message broadcasts to send warnings about disasters such as an approaching tsunami. Since the feature is not used much, it is contemplated in the present technology that SMS-CB and similar broadcast channels may be used as a resource for other purposes such as broadcasting to M2M devices, possibly when the broadcast channel is not required for more important traffic. For example, the broadcast channel may be used as a communication channel for implementing a coherent set of features for M2M device management and communication. Performing device management via a broadcast channel is presented herein as an alternative to existing methods of performing device management via point-to-point communication. In some embodiments of the present technology, broadcast and point-to-point channels are used in combination to achieve the benefits of both approaches.

In some embodiments, if a broadcast message is too large to fit within a single broadcast message (for example larger than 82 Bytes for a SMS-CB broadcast page), then it may be broken into portions and broadcast in a sequence of messages. For example, presently, SMS-CB allows for up to 15 pages to be concatenated to form a single message.

Embodiments of the present technology may leverage and/or interoperate with various features of SMS-CB, such as those defined in the following technical standards from the Third Generation Partnership Project (3GPP): 3GPP TS 23.041 "Technical Realization of Cell Broadcast Service"; 3GPP 48.049 "Base Station Controller—Cell Broadcast Centre (BSC-CBC) interface specification; Cell Broadcast Service Protocol (CBSP)"; 3GPP TS 23.038 "Alphabets and language-specific information"; and 3GPP TS 23.042 "Compression algorithm for text messaging services," each of which is incorporated herein by reference. For example, SMS-CB or Cell Broadcast Service may provide various mechanisms facilitating reliable, error-free message transport.

In some embodiments, broadcast messages may be used for one or more of: group M2M device triggering; transmission of application messages to groups of M2M devices; updating of network load rules; changing of application data stream identifiers; changing of service classes for a particular application, and the like. An M2M application may provide an application data stream name to the M2M network access control layer when requesting access to the network. The network access control layer maps the application data stream to a service class and/or a set of service class identifiers, for example by name. The mapping may be defined in the portal or server and dictated to M2M devices via broadcast transmission. In some instances, plural application data streams may be mapped to the same service class. A device may support multiple applications with different application data streams and stream names.

In some embodiments, duplicate application data stream names are not permitted. In some embodiments, an M2M device contains a single table mapping application data stream names to service classes. The table may also contain an element used to define the default service classes, to be used when the application data stream name sent by the M2M application to the network access control layer is not found in the table. In embodiments, if a default service class is not set and the application data stream name is not in the table, and no default service classes are defined, only rules associated with a global default service class will apply. For example, the first element in the table may be used to hold the global default service class identifier. The table may be stored in a list node.

In various embodiments, broadcast device management comprises: determining a group of one or more target M2M devices which are the intended recipients of a configuration and/or control message; configuring transmission of the configuration and/or control message; and transmitting the configuration and/or control message over a broadcast channel for receipt by the group of target M2M devices.

In some embodiments, configuring transmission of messages comprises determining regions where the target M2M devices, or at least a significant portion of the target M2M devices, are known or expected to be, and transmitting broadcast messages for reception within these regions. In this manner, use of broadcast resources may be focused toward relevant regions. In some embodiments, a network M2M access portal may be configured to keep track of the locations of M2M devices, including the M2M devices in a target group. M2M device locations may be tracked with at least regional resolution.

In some embodiments, individual M2M devices may be associated with one or more groups, and configured with one or more group addresses for addressing same. Group addresses may be programmed into devices before or after deployment, and may be altered as needed. In some embodiments, a broadcast message may contain a group address or set of group addresses. Each M2M device in receipt of the broadcast message may process the group addresses to determine (for example, by matching) if the message is addressed to it. If not, the message may be ignored. In some embodiments, all M2M devices are associated with a predetermined global group address. The list of group addresses may be stored at a certain node within the M2M device.

In some embodiments, quality of service (QoS) measures may be implemented for transmission of messages, such as broadcast control and/or configuration messages, to M2M devices. QoS levels may be varied for different messages or message classes, by varying the QoS measures implemented. QoS levels may be set in the application layer of the portal before a broadcast message is sent out. The QoS level may be sent on a per-message basis or per-group address basis, except, in some embodiments, for the number of message repeats, which may be set per SMS-CB message. QoS levels may be varied in order to adjust the impact that communication with the M2M devices has on network operations. QoS levels may be varied based on current network capacity.

In some embodiments, QoS measures may comprise repeating transmission of messages a predetermined number of times. Increased message repetition may increase the probability that the messages are received, at the cost of increased use of network resources. In some embodiments, the number of repetitions, frequency of repetitions and/or the repetition conditions may be pre-configurable. The number of repetitions may be specified and enabled using existing SMS-CB message repeat mechanisms.

In some embodiments, QoS measures may comprise requiring target M2M devices to acknowledge the receipt of transmitted messages. If an unsatisfactory number of target M2M devices do not acknowledge a message, the message may be repeated. If a threshold number of target M2M devices within a broadcast region do not acknowledge a message, the message may be repeated via broadcast. If only a few target M2M devices do not acknowledge a message, or if the broadcast channel is deemed ineffective, the message may be repeated via point-to-point (non-broadcast) transmission.

In some embodiments, broadcast messages may be configured with a predetermined security level. In further embodiments, the security levels of messages transmitted to and/or from M2M devices may be changed on a per message basis. In some embodiments, each message may be used to specify and/or facilitate the security level of a subsequent message. By providing the capability to vary security levels, network resource overhead and security may be traded off against each other. Message security levels may be defined on a group basis, with security parameters held and defined for each given group address.

For example, in some embodiments, each broadcast message for reception by a group of M2M devices may be encrypted and every $k^{th}$ message may include a new nonce for use on the next k broadcast messages, where k is adjustable per-message or per group of messages. A nonce may be used for implementation of various security measures as will be readily understood by a worker skilled in the art. For k>1, security may be lower, but fewer network resources may be used, as the message payload space occupied by nonce codes is reduced, on average, as k increases. In some embodiments, a new nonce may be transmitted opportunistically, when there is available message space. In some embodiments, a new nonce may be transmitted after a predetermined amount of time or data. In some embodiments, a new nonce may be transmitted when there is space or after expiry of a predetermined time, whichever occurs first. In some embodiments, a new nonce may be broken up and parts thereof may be transmitted in different messages, for later reassembly. In some embodiments, the security level may be varied according to available message capacity. For example, maximum security may be used when there is available capacity within the 82-byte payload of a SMS-CB broadcast message page, by sending a nonce in the message. Thus, the broadcast message transmission size may be fixed, and the security level may be adjusted based on available space in the transmission, which may vary based on message content. The parameter k may itself be configured via broadcast message, and may be adjusted in response to network capacity, network congestion level, current network utilization, time of day, network events, or the like, or a combination thereof.

In some embodiments, each M2M device may be provided with at least one group address and nonce, for example at the time of manufacture or as part of an initial device management session which provides configuration via unicast.

In some embodiments, when broadcast messages are intended to elicit an acknowledgement from target M2M devices upon receipt, the broadcast message may contain an indication regulating M2M acknowledgement behaviour. For example, a field in the broadcast message may specify a parameter that the M2M devices are configured to use randomized timing of their acknowledgement transmissions. The parameter may comprise a range of time delays from which the M2M device randomly selects a time delay for waiting before transmitting the acknowledgement. The parameter may comprise parameters of a predetermined type of probability distribution for randomly selecting time delays. Acknowledgements may be via mobile-originated SMS messages or other channel. By randomizing the times at which the M2M devices transmit acknowledgements, high traffic peaks may be alleviated. By controlling the randomization parameters, average responsive times and traffic peak levels may be controllably traded off against one another.

In some embodiments, if, after a maximum time delay, a target M2M device has not transmitted an acknowledgement, the present technology is configured to re-transmit the message to that target M2M device via unicast. If a substantial number of target M2M devices have not transmitted acknowledgements, a broadcast re-transmission may be used. The maximum time delay may be set based on the maximum time delay which the M2M devices are configured to wait before transmitting acknowledgements, based on the parameter specified in the broadcast message.

Some embodiments of the present technology relate to one or more methods by which M2M devices transmit acknowledgements, when required, to acknowledge messages such as broadcast configuration and/or control messages. In some embodiments, the acknowledgement method may be varied based on a desired QoS level. Acknowledgement behaviour of specific M2M devices may be configured via a configuration/control message.

In some embodiments, transmission of message acknowledgements by an M2M device may be disabled. In this case all messages are treated as successfully received unless a specific request for retransmission is received from an M2M device. Messages may contain sequentially numbered sequence numbers which are monitored by the M2M devices. An M2M device may detect missed messages via detection of an unexpected jump in sequence numbers, and in this instance may transmit a message requesting retransmission of the missed message or messages. In some embodiments an M2M device may wait until completion of a specified or expected sequence before initiating a request for some or all missed messages.

In some embodiments, acknowledgements may be transmitted via SMS messages originating from M2M devices. As described elsewhere herein, the SMS devices may be transmitted after a random delay to avoid undesired SMS traffic peaks.

In some embodiments, an M2M device with a pending acknowledgement to send may attempt to transmit the acknowledgement via an IP tunnel, for example piggy-backing the acknowledgement. As would be readily understood by a worker skilled in the art, an IP tunnel provides an IP connection between the M2M device and another node in the network, by tunnelling IP packets within another communication protocol. In some embodiments, if there is no IP tunnel currently established, the M2M device may wait up to a predetermined amount of time for its establishment. If the IP tunnel is not established within the predetermined amount of time, the M2M device may transmit the acknowledgement by another means, such as via SMS. More generally, the M2M device may attempt to wait until an application operating at least partially on the M2M device begins transmitting data, before transmitting the acknowledgement. This allows the M2M device to use the IP tunnel set up by the application for transmitting the acknowledgement. Furthermore, this may assist in spreading acknowledgements from different M2M devices over time. Alternatively, the M2M device may cause an IP tunnel to be established for sending the acknowledgement, and the tunnel may be retained or not retained after the acknowledgement is communicated.

In some embodiments, an M2M device may be configured to transmit an acknowledgement every k messages, where k is optionally configurable and may be greater than one. The M2M device may keep track of the number of messages received between acknowledgements by examining the message sequence numbers, when available. This may reduce acknowledgement traffic. If an M2M device detected a missed message, it may be configured to request retransmission of the message by sequence number, either in a separate message or within its next transmitted acknowledgement. The parameter k may itself be configured via broadcast message, and may be adjusted in response to network capacity, network congestion level, current network utilization, time of day, network events, or the like, or a combination thereof. The parameter k may be specified according to application requirements, for example QoS requirements, wherein the application involves communication with the M2M device.

In some embodiments, an M2M device may retain a table of pathname shortcuts, comprising a set of shortcut labels and associated full pathnames. Messages transmitted to the M2M device which include information related to pathnames may then use the shortcut labels in place of full pathnames in order to economize on bytes sent. The table of shortcuts may be located at a predetermined node in the M2M device file system. For example the pathname shortcuts can relate to OMA-DM node paths, paths to locations in an M2M device for a particular application, or the like. In some embodiments, these pathname shortcuts can be used during communication from the M2M device back to the portal or network, however in this instance this direction of communication would not be using a broadcast type method.

In some embodiments, a shortcut path to managed nodes may be implemented. For example, a 16-bit number may be used in lieu of a long string name. A shortcut table version number may be tracked to ensure that the short cut table used by the server and by various M2M devices is synchronized. The version number may be transmitted in a broadcast message packet header.

In some embodiments, the shortcut table may be updatable, and shortcut table versions may be tracked using a shortcut table version number. In some embodiments, the shortcut table may be opportunistically updated via cell broadcast, that is, when space is available in broadcast messages. In some embodiments, shortcut tables are only updated in their entirety, to avoid the possibility of shortcut mismatches. In some embodiments, messages transmitted by a server to one or more M2M devices may specify a shortcut table version number, for example in a packet header. The M2M device may check to ensure the version number in the message matches the version number of its currently stored shortcut table. If the stored shortcut table is out of date, the M2M device may deem it unusable and may optionally request an update. In some embodiments, the shortcut table version number is specified at regular intervals, but not necessarily in every message.

In some embodiments, a security mechanism is provided wherein security parameters may be specified and held for each M2M device group address. Thus, for each broadcast message transmitted to a given group address, the security level may be specified independently of other messages addressed to other groups. In some embodiments, each group is associated with its own encryption policy. If an M2M device in receipt of a message belongs to multiple groups, it may use the policy associated with the group identified in the currently received message. In some embodiments, the security level may be varied on a per-message basis, even within the same group.

In embodiments, security levels may be varied in order to adjust the impact that communication with the M2M devices has on network operations. Security levels may be varied based on current network capacity.

According to embodiments, different security levels may include: no security; message encryption; message authentication; and message encryption plus message authentication. When encryption is used, different security levels may correspond to different levels or strengths of encryption. When authentication is used, different security levels may correspond to different levels of authentication. A message authentication code may be used within a header to provide protection against eavesdropping, man in the middle attacks, and replay attacks, for example.

In some embodiments, a broadcast message packet may comprise the following fields, either in the order listed or in a different order. The packet header fields may include one or more of: a version number, a group address, a packet options field, a sequence number and a length field indicative of the length of the header and body. In one embodiment, the preceding fields are mandatory. The packet options field may specify options such as: whether the message needs to be acknowledged and if so what the backoff time interval is, and what security measures have been implemented. The packet header fields may further include one or more of: a shortcut table version number field, a message authentication code field, and a checksum field. In one embodiment, these packet header fields are optional, and each may be preceded with a field type. The packet body may comprise one or more messages, such as update, configuration or control messages. Each message may comprise a path string and a value. If the message corresponds to an instruction for updating an entry in a list, the message may comprise a path string, a list index, and a value. Thus, entries in a list may be updated without having to re-transmit the entire list. The path string may correspond to the path associated with a particular aspect or functionality of the M2M device, for example in a structure compatible with the management tree path structure of OMA-DM.

In some embodiments, independent list entry updating may be facilitated by creating leaf nodes for each element in a list, with each leaf node labelled with its index into the list. Thus, the list entries may be updated independently and directly by updating the corresponding leaf nodes.

M2M Network Access Control

M2M network access control may relate to a control plane mechanism that controls access to network resources, for example related to one or both of the signaling plane and the user plane, by a related M2M application. Policies may be established to govern access, and these policies may be set up using existing, legacy unicast device management transport mechanisms (e.g. OMA-DM, communication via IP or SMS, or the like) or using broadcast device management over a broadcast channel, such as a Cell Broadcast channel. Using broadcast device management for establishing and configuring policies and/or for general configuration of M2M network access control, or using a combination of unicast and broadcast device management, may be more efficient in various situations. M2M network access control may operate at least in part as a built-in functionality or agent of an M2M device. M2M network access control may operate at least in part as a built-in functionality or agent of a remote server or application running thereon. M2M network access control may operate as a functionality split between the M2M device and a remote server or application. In some embodiments, M2M network access control may be provided as a separate but interactive functionality from broadcast device management.

In some embodiments, M2M network access control comprises one or more of: setting or managing network access rules, including traffic load spreading controls; changing or managing data stream names or service class identifiers of an M2M application; assigning or managing network access policies to groups of devices; triggering a device to start a device management session, and/or other functionalities. A network access policy is a set of network access rules governing the conditions under which an application is permitted to access the network. A network access policy may define a set of one or more service classes and associated attributes. A service class may be regarded as a QoS service level. Each network access rule may be associated with one or more service classes. Different network access rules may be defined for different service classes within a group. In some embodiments, M2M network access control may be configured to indicate to M2M terminals the levels of network congestion. Multiple service levels may be supported for all network access control services.

In some embodiments, M2M network access control may be configured to determine whether to use unicast or broadcast messaging to reach target M2M devices, for example based on a consideration of efficient use of network resources. This functionality may be enabled by a decision engine operating on a remote server, for example. This functionality may use data regarding the locations of target M2M devices and the probabilities that the location data is current and correct.

For example, in the case where a message is to be sent to multiple M2M devices, and the message may be sent either by contacting the M2M devices individually by unicast (e.g. by point-to-point SMS message or IP packet), or by broadcast message (e.g. by SMS-CB broadcast), embodiments of the present technology are configured to identify opportunities to replace plural unicast messages with a single broadcast message, and to capitalize on such opportunities if they are cost-effective. In some cases, the message may be sent via plural broadcast messages, or via a combination of unicast and broadcast messages.

The decision may comprise computing the cost associated with different messaging options, where the cost may be a monetary cost, or another pre-defined cost function. The cost function may account for various aspects, such as network resource usage, network delays, monetary charges incurred, reliability, and the like.

For example, when determining whether to message k M2M devices via k separate unicast messages or via a single broadcast message, the unicast cost may be calculated as k times $(a+b+c)$ where a represents a delay cost, b represents a triggering cost, such as an SMS triggering cost, and c represents a data cost. The delay cost a is included since M2M devices may be offline and thus unreachable via unicast for long periods of time to conserve network resources, so large delays may potentially be incurred. In contrast, some types of broadcast messages, such as SMS-CB, may be receivable by an M2M device even when it is offline, thus the delay may be considerably less. The broadcast cost may be calculated as $d*e+f$, where d represents the cost of transmitting a broadcast message page, e represents the number of message pages required to communicate the message, and f represents a reliability cost associated with the broadcast method. Other formulas and/or criteria for carrying out cost/benefit comparisons of unicast vs. broadcast options may be used. In some embodiments, QoS and/or security considerations may be taken into account. For example, unicast may be preferred if higher security is desired. As another example, if acknowledgements are required from M2M devices, unicast may be used to control timing of acknowledgements, by controlling timing of the unicast messages wherein receipt of the unicast message influences when the acknowledgement is transmitted, for example by specifying that acknowledgements are to be transmitted immediately upon message receipt.

Figure 3:
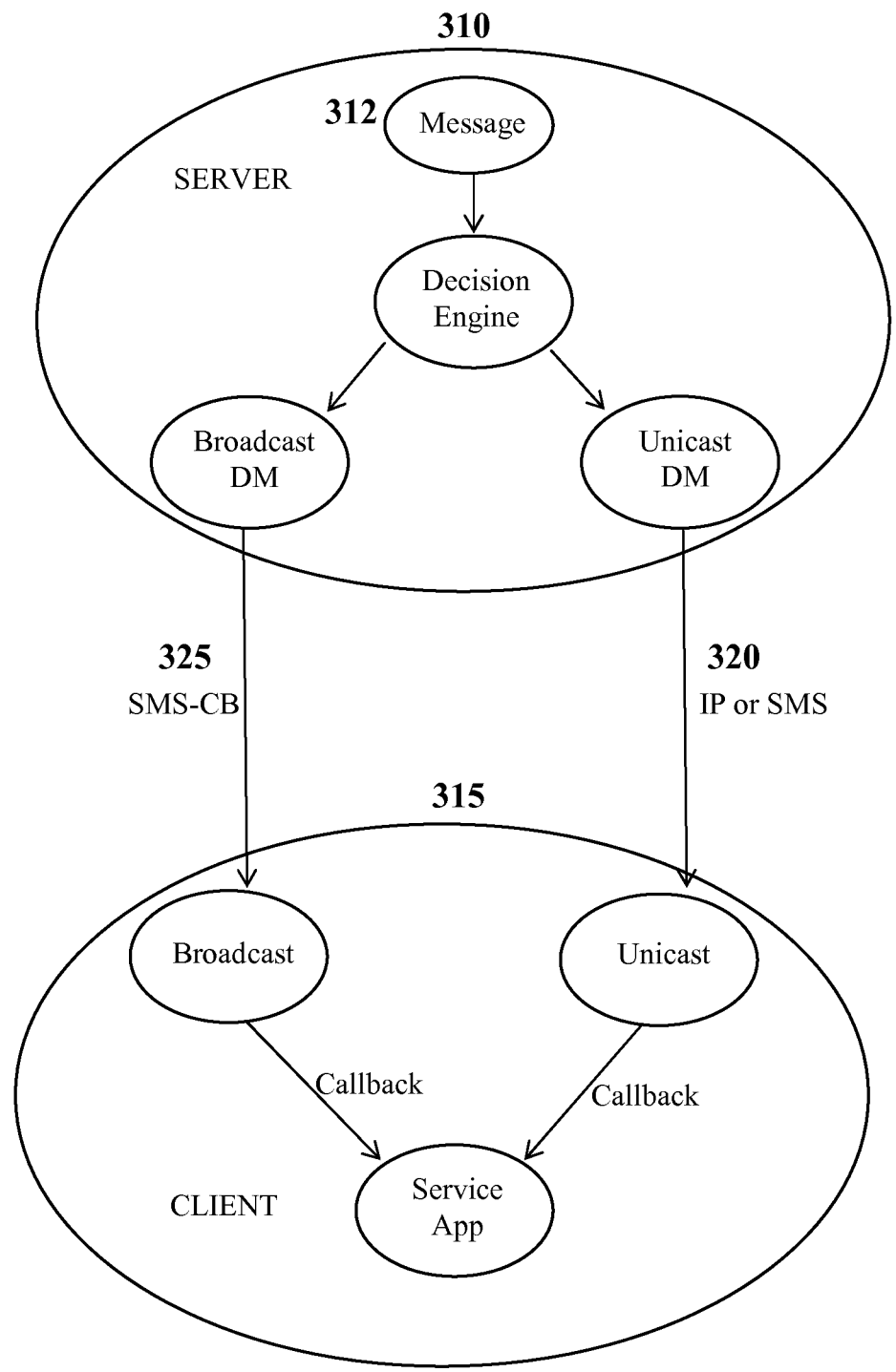
FIG. 3 illustrates aspects of interaction between a server and a client M2M device, in accordance with embodiments of the present technology.

FIG. 3 illustrates a server 310 such as an application server with a message 312, such as a device management message, intended for a client M2M device 315. The server 310 may be wirelessly communicatively coupled to the client 315 via a unicast channel 320 or a broadcast channel 325. The unicast channel may use IP communication over wireless, SMS, or the like. The broadcast channel may use SMS-CB or other suitable method as would be readily understood. The server 310 is configured to determine which of the two channels 320, 325 to use for transmission of the message 312, and to initiate transmission using a selected channel. The client 315 is configured to receive and process the message. In some embodiments, the client may receive and initially process messages received over the unicast channel 320 via a different mechanism than messages received over the broadcast channel 325, although further processing may be performed by a common mechanism. The different mechanisms may be operatively coupled to the common mechanism via use of callback functions. As would be readily understood the noted server can be a single computing device or a collection of computing devices provided the desired functionality.

In some embodiments, network access control comprises defining network access rules which dictate when and/or how a designated M2M device is to access network resources. Each network access rule may be implemented as a conditional, e.g. "if then" statement, mapping one or a combination of conditions to an action. The combination of conditions may be a Boolean combination, for example. Conditions may include: time of day (ToD), network congestion level (Cong), and network event limitations (NE). Network access rules may further be specific to a service class identifier and/or application data stream identifier. Actions may include: restricting network access; allowing network access; sending an alert to a portal; resetting the M2M modem; limiting download data rates; limiting upload data rates; and changing the current service class. Network access rules may be updated via broadcast or unicast message from a portal or server.

In some embodiments, network events are events which use network resources in the wireless network. Network events may comprise packet data protocol (PDP) context events such as PDP activations, mobility management events, device attach events, upload and/or download data usage events (such as data usage metrics relative to a predetermined level or data usage occurring), SMS usage events (such as SMS transmission or reception events, or SMS usage metrics relative to a predetermined level), circuit switched registrations, circuit switched voice minutes, radio resource control (RRC) state transitions, user-generated events, and network load estimate events. Example events include: monthly attach time for an M2M device being greater than 1 hour, greater than 50 attaches per month for an M2M device, greater than 5 attaches per 10 minutes for an M2M device, and greater than 10 KB downloaded per day for an M2M device. Network access rules may be re-evaluated upon occurrence of each network event.

In some embodiments, network access rules are configured having hysteresis, for example such that the conditions for inhibiting access when access is currently allowed differ from the conditions for allowing access when access is currently inhibited. This may be used to avoid oscillating effects at marginal network conditions.

In some embodiments, each network access rule is associated with a random back-off time range. After the end of a period of restricted access in which pending transmissions may build up, the M2M devices are configured to wait a random amount of time within the back-off time range, to avoid traffic peaks. Random time delays for transmitting messages after a period of restricted access may be implemented similarly to random time delays for transmitting acknowledgements, as described elsewhere herein. For example each M2M device may generate a random time delay independently, but based on a random backoff parameter such as a time interval or probability distribution which influences generation of the random time delay. The ending of the period of restricted access may be indicated by transmission of a broadcast message indicative that network access is allowed following a period in which network access had been denied. Optionally the broadcast message may specify the random backoff parameter.

In some embodiments, if two network access rules are evaluated where one allows access and one restricts access, the restriction rule takes precedence. In further embodiments, this setting may be configurable. In some embodiments, if no rule exists for a particular ToD, then by default network access is allowed.

In some embodiments, generating a randomized time delay, whether for transmission following a period of restricted access or for transmission of acknowledgements, may comprise setting a backoff timer with a random value. Once the backoff timer expires the M2M device transmits its message. Randomization may be used in conjunction with other scheduling methods. For example, different subgroups of M2M devices may be assigned different time intervals during which transmission of acknowledgements and/or transmission of other messages is authorized. By defining different time intervals for different subgroups, transmission may be spread in time in order to avoid traffic peaks. Each M2M device within a subgroup may randomize its transmission time within its defined interval.

In some embodiments, the backoff timer may be temporarily suspended when network access is restricted. For example, if ToD, Cong or NE components of the network access rule change such that access is suspended while the backoff timer is counting down, the backoff timer may be suspended. When access is re-allowed, the backoff timer may then continue, rather than computing a new backoff timer value. Furthermore, if access is restricted after timer timeout but before the network can be accessed, the device may be allowed to access the network immediately upon access re-allowance. In some embodiments, the backoff timer may be reset after a predetermined long period of access restriction.

In some embodiments, network access rules may be specified as being applicable to one or more radio access technologies. Radio access technologies may include 1×RTT, EVDO, GSM, UMTS, HSPA, LTE, Wi-Fi™ and the like.

In some embodiments, ToD conditions may be used to set the time(s) of day and optionally day(s) of week or day(s) of month at which network access is allowed. This may facilitate spreading network access for various devices or groups so as to control potential congestion. Time may be local time or universal time. For example, ToD conditions may specify that network access is allowed every 15 minutes for 5 minutes, one week of every month, only on weekends, weekdays between 7 pm and 9 pm, and the like. ToD conditions may be combined with other conditions, including other ToD conditions, using Boolean logic, to define when network access is allowed. ToD conditions may be different from device to device and/or from group to group.

In some embodiments, broadcast messaging, such as via SMS-CB, may be used to facilitate multi-level congestion control in relation to network access control. This is an example of device management via broadcast messaging as described elsewhere herein.

In some embodiments, an M2M device may be configured to restrict network access based on congestion levels in the network. For example, if network congestion is above a predetermined threshold, the M2M device will not transmit certain messages. Congestion levels may be evaluated and/or controlled at a remote server, at an intermediate device coupled to the network, at the M2M device, or at a combination of the above. Congestion indicating and/or control messages may be broadcast to plural M2M terminals, for example according to group address. Congestion may be evaluated for the entire wireless network or for various portions thereof. Since congestion can occur at different layers in the system, different entities at different layers may independently define congestion criteria for network access rules. The different entities at different layers may further be configured to independently broadcast congestion level information to be used by network access rules. Each M2M device may be configured to estimate congestion levels, in absence of or to augment broadcast congestion level information.

In some embodiments, when a network access rule is associated with a long time range in which an M2M device is enabled to access the network, a random time may be selected before access is allowed. The random time may be selected according to parameters, such as minimum and maximum times or probability function parameters. The parameters may be particular to a group of M2M devices, a service class, or the like, or a combination thereof.

In some embodiments, each M2M device, service class, or group may be configured with a predetermined maximum delay time. If the M2M device has a pending message and the maximum delay time has expired, the message can be transmitted regardless of at least some other network access rules which may be in effect. In some embodiments, the message is transmitted immediately upon expiry of the maximum delay time. In some embodiments, the message is transmitted at the earliest opportunity after expiry of the maximum delay time, subject to one or more sufficiently high-priority network access rules.

In some embodiments, when an M2M device or application running thereon makes a request for network access, and a service class or application data stream identifier is not specified in the request, a default set of network access rules may be applied. The default set of network access rules may be those associated with a default service class, which may be specified by a server and communicated to various M2M devices. If multiple default service classes are specified, default network access rules may be defined as those associated with all of the specified default service classes.

In some embodiments, an override service class may be available for use. The override service class may provide a mechanism by which certain network access rules are always applied regardless of conditions that might otherwise specify different network access rules as applicable. For example, if an invalid service class identifier or application data stream identifier is provided by an M2M device or application, the override service class may be used to override the default network access rules. In some embodiments, the override service class may be reserved on an M2M portal on the network side. Network access rules that belong to the override service class may be applied always, regardless of what the M2M terminal service class identifier would otherwise determine.

In some embodiments, an application data stream identifier is used to map application data streams to service classes and/or applicable sets of network access rules. This creates a level of indirection which may be used to facilitate development, support, implementation of legacy applications, and the like. For example, M2M application developers may specify an application data stream identifier and delegate the implementation of service classes and network access rules to another person, who does not have to modify the application but assigns an association between the application data stream identifier and a set of select service classes and/or network access rules. Assigned associations may be stored in a look-up table, for example. Changes to service classes associated with the M2M application may also be implemented by updating the look-up table, rather than modifying the M2M application.

In some embodiments, a service class identifier is assigned to each device. Each device may have a substantially unique service class identifier, although uniqueness may not be strictly required. In some embodiments, devices may initially have a unique service class identifier, which can be later changed to a unique or non-unique value. In some embodiments, uniqueness is managed by the portal.

In some embodiments, when making a request for network access to the network access control layer, an M2M application is configured to specify which rules apply by specifying the service class identifier. Each group and/or network access policy can define a set of service classes. If desired, policies can "share" a service class. This allows policies to build upon other lower layer policies. When a service class is shared the same service class identifier may be used.

According to embodiments, the portal can set three attributes per SC: the maximum delay, the spreading delay range, and whether the SC is a default SC.

In some embodiments, an M2M device may be triggered from an off-line state. That is, the M2M device may enter an off-line state but still be receptive to broadcast messages such as SMS-CB messages. Thus, a broadcast trigger may be issued to such devices. In some embodiments, the M2M device may inform a server of its location before going off-line, thus allowing the broadcast trigger to be transmitted in the appropriate region.

Additional Features

In some embodiments, each M2M device includes a broadcast device management message parser, which is configured to perform on or a combination of the following: parse device management messages; implement group addressing; implement security routines; manage callback functions, and the like. Parsing of the message may include: confirming the correct broadcast device management protocol version number; and putting the message header information into a structure. The group addressing function may include: comparing the received Group Address with a list of addresses stored in the device. If a match is not made the packet can be discarded otherwise processing continues. A list of the M2M device Group Address may be stored at a predetermined node, for example as a variable length array. The index of the group address in this list may be used to index other parameters in the system e.g. (auth policies, cipher policies, nonces, or the like). This index may be referred to as the "Group Address Index". The call security function may include for example: if required, call authentication routines; if required, call de-encryption routines; after decryption, parse all the update messages and replace shortcuts with full path names; if the path is register for a callback, the update callback is called.

In some embodiments, the device comprises a service for facilitating sending user plane data to the application layer. A higher layer application may be configured to register a call back with the message parser to be called when a predetermined node is written to. This application may then process the written data to determine which application the data should be sent to. The written data contains the name of the application the data is to be sent to. According to embodiments, the intended applications need to register with this service to be able to get data delivered from this service.

In some embodiments, the device comprises a certain higher layer trigger application, which is configured to register a call back with the message parser when it writes new data to another predetermined node. The trigger application may process the data in that node to determine which application e.g. portal to contact. The portal name may be specified in the data. To avoid peaks in network resource usage when plural M2M devices are to access the network after the group trigger is received, the M2M devices may be configured to randomize timing of their initial access to the network. The range of delay may be fixed, controlled by a policy variable, or sent within the trigger message. In some embodiments, the randomization period increases with the number of devices in a group and is specified in the group trigger.

In some embodiments, network event monitoring policies may be specified, for example at each M2M device. Network event monitoring policies may define and control which network events to monitor, how often to transmit monitoring data to a portal, or a combination thereof. Monitoring policies may be group dependent or device dependent.

In some embodiments, M2M devices are configured to authenticate the portal. This may comprise the use of nonces, for example. The length of the nonce should be at least equal to the length of the output of the hash function, i.e. 16 bytes for MD5 and 20 bytes for SHA1 may be used as hash functions. The nonce may be valid for each Group Address. Since an M2M device may have many Group Addresses assigned to it, the device may have to store and manage many nonces. The nonces may be stored in a predetermined list tree node and may be indexed via the Group Address Index.

In embodiments, order to authenticate, the device may compute a Message Authentication Code (MAC) key and verify that it matches the MAC key provided in the header. The computation of the MAC may be generated using a hash function (e.g. MD5 or SHA1) with the message payload, address, and nonce as input. The message header may remain unsigned.

According to embodiments, the type of hash function used (e.g. MD5 or SHA1 or the like) may be managed through a tree node in the access policies and thus does not need to be sent for every msg. Since different authentication functions can be used for different Group Addresses a list of authentication policies needs to be maintained. Similar to the nonce, a node specific to the group address can contain the authentication policy. The authentication policy may be stored in a predetermined list tree node and may be indexed via the Group Address Index.

According to embodiments, unlike most authentication protocols, the nonce is not necessarily mandated to change every msg. The nonce will be changed only when the 'Nonce' header is sent in the protected header. Changing the nonce more often helps protect against replay attacks but requires a significant number of bytes to perform. The frequency of the nonce changes, may be set according to the application layer's security requirements.

In some embodiments, if the MAC fails, the M2M device may initiate a challenge with the portal via normal TCP/IP and AWTDA methods to sync the nonce. Failure of the MAC is typically caused by the nonce being out of sync, for example because the M2M device missed a message where the nonce was updated. The challenges may be randomly delayed so that all device do not simultaneously create load. There may be some exponential backoff when the device finds itself initiating challenges often as this will help with DoS attacks.

According to embodiments, for encryption, AES Cipherblock chaining with a 128 bit key or 256 bit key may be used for ciphers. However, given the short length of broadcast device management protocol (BDMP) messages and the overhead needed to append pad bytes, shorter key lengths may also be supported. The choice of cipher may be up to the application layer and may be controlled by a node in the policy. Since different encryption functions can be used for different Group Addresses, a list of encryption policies may need to be maintained per Group Address. Similar to the nonce a group address specific node may contain the Encryption policy. The Encryption Node policy can be stored in a predetermined list tree node and may be indexed via the Group Address Index.

In some embodiments, encryption may start at the start of the body of a BDMP message. The encryption cipher key may be calculated using a hash function (e.g. MD5 or SHA1) with the address and nonce as input. It may be necessary to concatenate the hash function output or truncate it to fit the required length of the cipher e.g. 128 or 256 bit). If authentication is also enabled the cipher and authentication may share the same nonce.

In some embodiments, if encryption is used without authentication, there may be no way for the device to verify it's nonce is up to date. In this case, the header may contain a CRC32 which is used by the device to verify the proper decryption of the body. If the CRC32 fails, the device may initiate a OMA-DM session with the portal to sync the nonce. This can occur regularly with a cell broadcast service (CBS) broadcast method (every time the device misses a message where the nonce has been updated).

In some embodiments, M2M devices and portals or servers are supported with Mobility Management (MM) functions. These functions maintain a registry of which Cell ID(s) the various M2M devices of various defined groups can receive. This information allows the portal to know which cells to broadcast device management messages on to reach members of a certain group of M2M devices.

According to some embodiments, the MM algorithm has a concept of a routing area, for example a list of cells that a given M2M device is guaranteed to be within. If the M2M device moves out of the routing area, it may be triggered to perform a routing area update.

In some embodiments, the size of the routing areas is determined based on one or more of: the cost of doing a routing update; the cost of doing a device management broadcast (e.g. SMS-CB) page per cell; the expected number of messages sent to a device; the cost of doing a unicast message to a device; and the probability of movement outside the currently defined routing area. In some embodiments, a dynamic algorithm based on these factors is used to determine routing area size.

In one embodiment the following algorithm may be used. The portal sets a maximum number of cell IDs, a maximum time visited value, and periodic evaluation time for a device based on the factors list above. When the device enters a new cell not currently in its routing area, it always adds this cell to the routing area and drops the last visited cell if the number of cells is greater than a predetermined maximum. Based on the set periodic evaluation time set by the portal, the device periodically, e.g. once a day, evaluates the cells last visited times to see if any exceed the maximum stale time if yes, that cell ID is deleted from the list, and a routing area update is done.

According to embodiments, for stationary M2M devices, the above algorithm should not create more than a few cells (i.e. it is possible due to cell breathing that a stationary device perform idle handoffs to different cells to optimize receive signal strength) in a routing area but for higher mobility devices, the list of possible cells could potentially be large and dynamic. In this case, further management may be required. Consequently, a larger list of cells may be associated with more mobile devices and a smaller list of cells may be associated with fewer mobile devices.

In some embodiments, if it is determined that a given M2M device is making excessive demands for communications resources then its access may be restricted in the future. More open access may be given to devices that make fewer demands. For example, a device may request a certain window for data transmission but may then need more network access time. If this happens it would be normal to stop the device and this would mean that data would remain to be sent in a subsequent allocation. It may be that this device consistently requests more access and if this is the case than it could be made to share the resource better by waiting. However, if a device has not been a frequent sender of excess data it may be allowed to continue transmission until it has sent some extra. This may be considered as a bonus access for good behavior. Network access may be managed for example by using a leaky bucket scheme to provide access "tokens" to the device at a predetermined rate, wherein the tokens may be saved and used as desired by the M2M device.

The technology will now be described with reference to specific examples. It will be understood that the following examples are intended to describe embodiments of the technology and are not intended to limit the technology in any way.

EXAMPLES

Example 1

Figure 4:
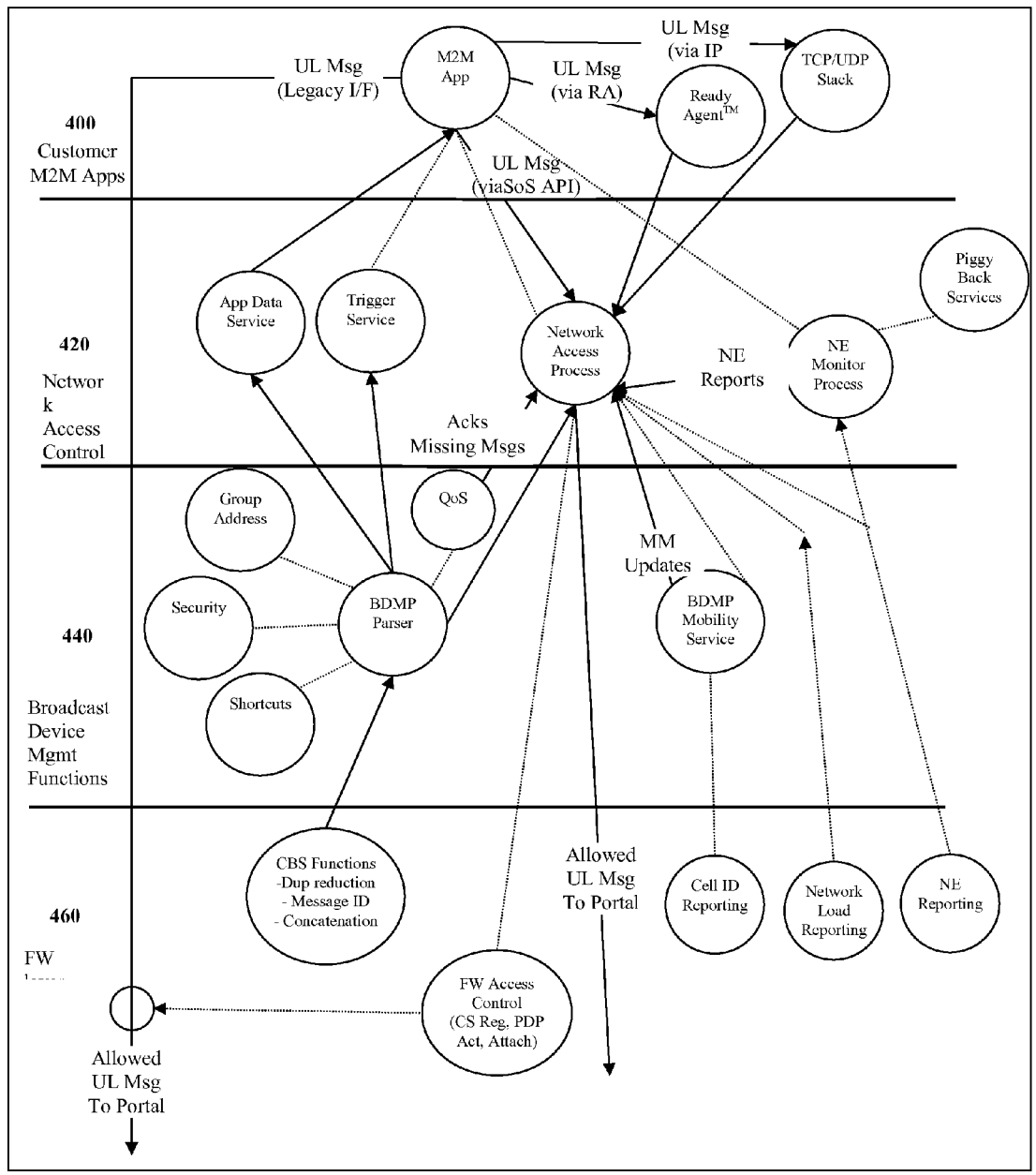
FIG. 4 illustrates the functional architecture of an M2M client device, in accordance with an exemplary embodiment of the present technology.

FIG. 4 illustrates the functional architecture of an M2M client device, in accordance with an exemplary embodiment of the present technology. Four functional layers are illustrated: the M2M application layer 400, the network access control layer 420, the broadcast device management layer 440, and the firmware layer 460. Various functions and their interactions may be facilitated by an appropriate combination of M2M hardware, software and/or firmware. The M2M device may comprise various components such as a processor, volatile and/or non-volatile memory, power supply, radio transceiver, antenna, and the like, which may be configured together to communicate via one or more predetermined protocol sets and to provide the M2M device functionality, as would be readily understood by a worker skilled in the art.

Within the M2M application layer 400, an application may send an uplink message via a legacy interface (thereby bypassing the two intermediate layers 420 and 440). Alternatively, the application may send an uplink message via packet data, such as TCP/IP or UDP IP stack. Alternatively, the application may send an uplink message via AirVantage™ Ready Agent™ (RA), or similar technology. Finally, the application may send an uplink message via a network access control application programming interface (API).

The network access control layer 420 provides various access control services. An application data service and trigger service are provided for passing data from a broadcast device management message parser to the M2M application. A network access process is also provided, for regulating network access in accordance with various network conditions, QoS settings, and the like. The network access control layer further provides for network event monitoring and piggy back services.

The broadcast device management layer 440 provides the broadcast device management message parser and a broadcast device management mobility service. The message parser receives, parses, and forwards received messages, such as SMS-CB messages or other broadcast messages received by the M2M device. Group addresses, security settings, and shortcuts may be accessed and/or modified by the message parser. The message parser may be operatively coupled to the network access process and acknowledgements and retransmission requests may also be generated based on parsed message information. The mobility service may receive information such as cell ID reporting information, and may interface with the network access process to implement mobility management functionality.

The firmware layer 460 is configured to implement cell broadcast service (SMS-CB) functions such as duplicate message reduction, message identification and message concatenation, and to forward selected broadcast messages to higher layers. The firmware layer is also configured to implement firmware-level access control measures, such as allowing or restricting circuit-switched (CS) registrations, PDP activations and/or attachments, and the like. Uplink messages are also passed through the firmware layer to the portal. The firmware layer is further configured to facilitate cell ID reporting, network load reporting, and network event reporting, for example by receiving and processing information from the network and forwarding this information to higher layers.

Figure 5:
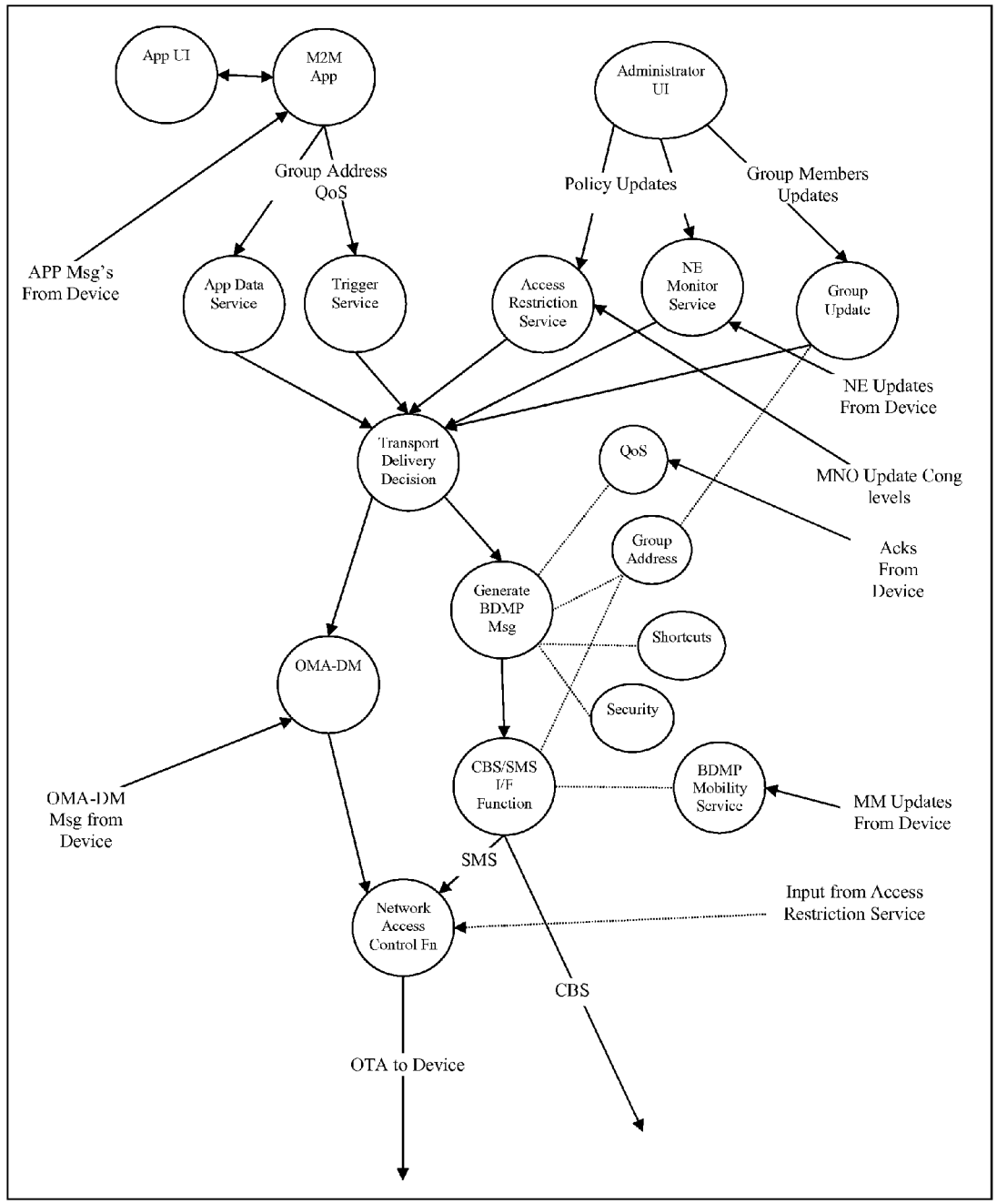
FIG. 5 illustrates the functional architecture of server device, in accordance with an exemplary embodiment of the present technology.

FIG. 5 illustrates the functional architecture of a server or portal device, in accordance with an exemplary embodiment of the present technology. The server or portal may be provided via a computer server, server bank, virtual server, or the like. The server equipment may comprise one or more processors, memory components, and other supporting computing components. The server equipment may be operatively coupled to one or more base stations via a wired or optical communication link and intervening network infrastructure, as would be readily understood by a worker skilled in the art. The base stations may be operated by a mobile network operator, for example. Various server/portal functions and their interactions may be facilitated by an appropriate combination of hardware, software and/or firmware.

The exemplary server device is configured to receive and process the following types of messages regarding client devices: application messages from clients, device management messages such as OMA-DM messages from clients, input from access restriction services, mobility management updates from clients, acknowledgement messages from clients, updates regarding congestion levels from mobile network operators, and network event updates from clients. The above messages may be generated by the clients and passed to the server device via network infrastructure. In some cases the messages may be generated or aggregated by an intermediate network infrastructure device, based on information received from client devices or generated by observing client device activity.

The exemplary server device is configured to generate the following types of messages for forwarding to client devices via wireless communication: unicast messages such as SMS messages, and broadcast messages such as SMS-CB (CBS) messages.

As illustrated, the exemplary server device comprises various functional modules, which will now be briefly described. An application user interface, an M2M server-side application coupled to the application user interface, and an administrator user interface are provided. The M2M server-side application is coupled to an application data service and a device trigger service, and transmits information such as group addresses and QoS information thereto. The administrator user interface is operatively coupled to an access restriction service, network event monitoring service; and a group update service. The administrator user interface may send policy updates and group member updates to these modules. The five services mentioned above are operatively coupled to a transport delivery decision module, which is configured to determine whether to deliver device management messages to clients via OMA-DM or via a broadcast device management message protocol (BDMP). Broadcast device management messages may be generated based at least in part on server functionalities for providing QoS information, group address information, shortcut table information, and security information. An interface function is provided for routing broadcast device management messages via SMS and/or SMS-CB (CBS). SMS messages may be subjected to network access control/restriction functionality.

Figure 6:
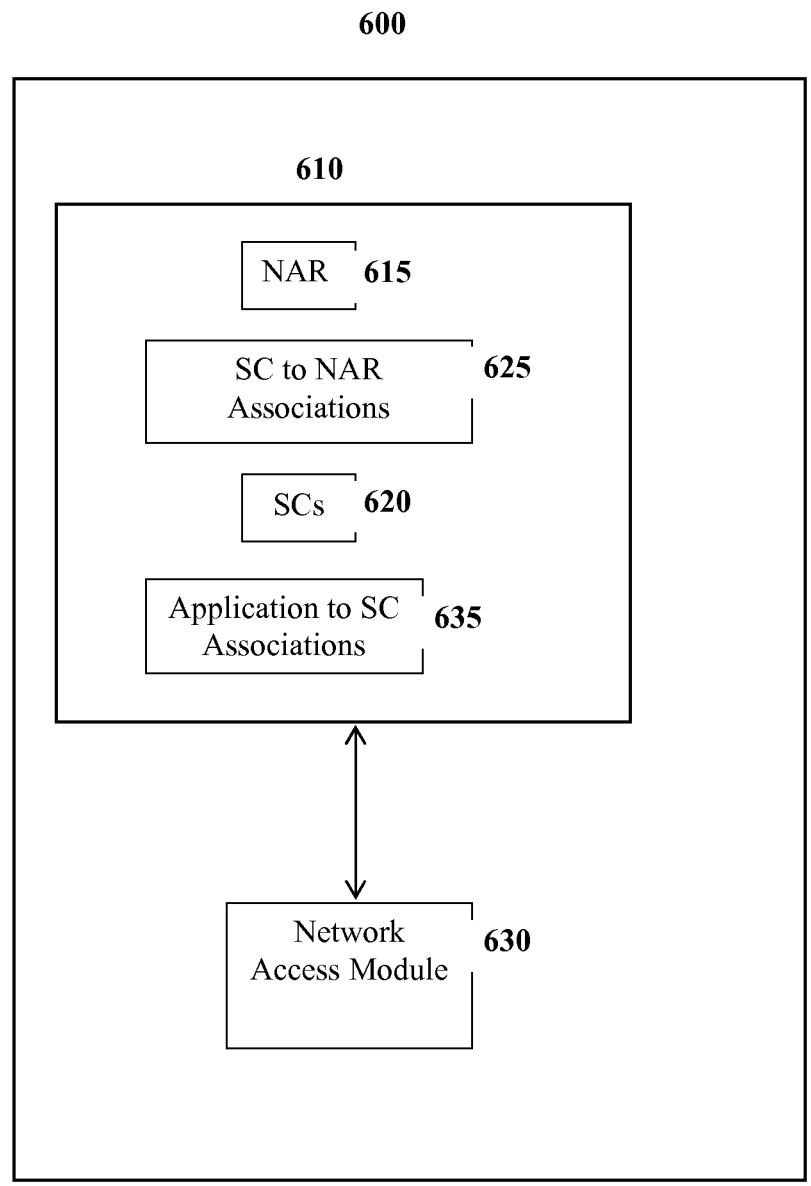
FIG. 6 illustrates a M2M device provided in accordance with embodiments of the present technology.

FIG. 6 illustrates a machine-to-machine (M2M) wireless device 600 provided in accordance with embodiments of the present technology. The M2M device comprises a memory 610, such as a volatile or non-volatile computer memory, which stores thereon a set of network access rules (NARs) 615 and a set of service classes (SCs) 620. The set of network access rules are for potential use in governing network access operations performed by the M2M device. Each service class is associated with a particular subset of the set of network access rules. The associations 625 are also stored in the memory 610. The M2M device further comprises a network access module 630 configured to: receive a request by an application running on the M2M device for accessing the wireless network; determine a service class associated with the application; and access the network in accordance with the determined service class and the subset of network access rules associated with the determined service class. Associations 635 between applications or application data streams, or their identifiers, and service classes are also stored in the memory 610. The network access module 630 may comprise a processor of the M2M device which executes program instructions stored in memory, and accesses a wireless transceiver of the M2M device in order to perform network access operations.

Figure 7:
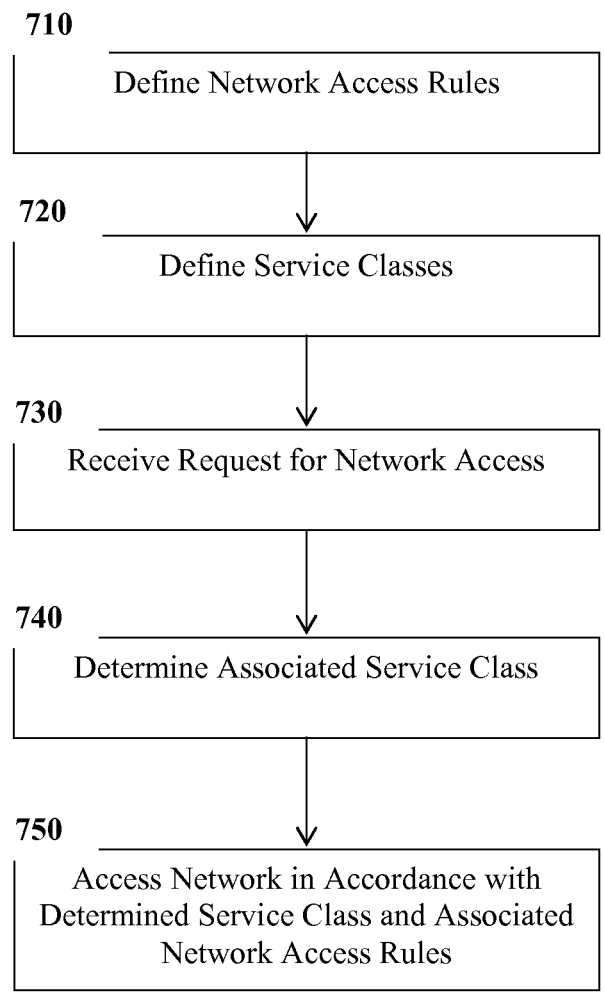
FIG. 7 illustrates a method for managing access to a wireless network by a M2M device, in accordance with embodiments of the present technology.

FIG. 7 illustrates a method for managing access to a wireless network by a machine-to-machine (M2M) wireless device, in accordance with embodiments of the present technology. The method comprises defining 710 a set of network access rules for potential use in governing network access operations performed by the M2M device. The method further comprises defining 720 a set of service classes, wherein each service class is associated with a particular subset of the set of network access rules. Such associations may also be defined as part of the service class definition. The method further comprises receiving 730 a request by an application running on the M2M device for accessing the wireless network. The method further comprises, upon receipt of said request, determining 740 a service class associated with the application, and accessing 750 the network in accordance with the determined service class and the subset of network access rules associated with the determined service class.

The set of service classes may include one or both of a default service class and an override service class. Determining the service class may comprises selecting the default service class when an association between the application and a particular one of the set of service classes is otherwise unspecified. Further, accessing the network may be additionally performed in accordance with the subset of network access rules associated with the override service class. For example, the override service class may apply in addition to other invoked service classes. Conflicts between network access rules when two or more service classes apply may be resolved in various ways, for example by accessing the network in a manner such that all network access rules are respected as much as possible, and ignoring conflicting network access rules of lower priority if necessary.

In various embodiments, at least one of said network access rules defines or is associated with a random back-off time parameter. In various embodiments, at least one of said network access rules defines or is associated with a maximum wait time parameter.

It will be appreciated that, although specific embodiments have been described herein for purposes of illustration, various modifications may be made without departing from the spirit and scope of the invention. In particular, it is within the scope of the invention to provide a computer program product or program element, or a program storage or memory device such as a transmission medium, magnetic or optical wire, tape or disc, or the like, for storing signals readable by a machine, for controlling the operation of a computer according to the method of the invention and/or to structure its components in accordance with the system of the invention.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for managing machine-to-machine (M2M) wireless devices from a remote server, the method comprising:
   configuring and controlling one or more M2M wireless devices at least in part using one or more broadcast messages transmitted over a wireless communication link; and
   transmitting an acknowledgement from at least one of the M2M wireless devices in response to receipt of one of the broadcast messages, wherein said one of the broadcast messages contains a parameter for use by the at least one of the M2M wireless devices in randomizing timing of transmission of said acknowledgement.

2. The method according to claim 1, wherein at least one of the one or more broadcast messages is configured to initiate configuration updates for the one or more M2M wireless devices.

3. The method according to claim 1, further comprising adjusting a level of security of said broadcast messages on a per message basis, based at least in part on security requirements from an application.

4. The method according to claim 1, wherein the parameter is configured based at least in part on current network conditions.

5. The method according to claim 1, wherein at least one of the one or more M2M wireless devices is configured to store at least one shortcut parameter, and wherein a remote server stores a corresponding shortcut parameter, said shortcut parameter indicative of a shortened version of a full identifier, the full identifier usable for operation of the at least one M2M wireless device, and wherein at least one of the one or more broadcast messages includes one or both of: an update to said shortcut parameter; and an indication of whether the shortcut parameter currently stored by the at least one M2M wireless device matches the corresponding stored shortcut parameter.

6. The method according to claim 1, wherein at least one of the one or more broadcast messages includes a random back-off parameter for configuration of the one or more M2M wireless devices, wherein the one or more M2M wireless devices are configured to wait for a random amount of time before initiating network access in response to a broadcast, wherein generation of said random amount of time is performed independently by each of the one or more M2M wireless devices and influenced by said random backoff parameter.

7. The method according to claim 1, wherein M2M wireless devices are configured to transmit acknowledgements in response to receipt of every $k^{th}$ broadcast messages addressed thereto, the method further comprising adjusting k based at least in part on requirements of an application involving at least some of the M2M wireless devices.

8. The method according to claim 1, wherein each of the broadcast messages are addressed to a group address defined in the broadcast message, and wherein a security mechanism is provided for the associated broadcast message, said security mechanism having security parameters specific to the group address.

9. The method according to claim 1, further comprising actively tracking locations of the M2M wireless devices by retaining a list of cell IDs visited during a predetermined time interval, said list limited to a maximum number of entries.

10. The method according to claim 1, wherein at least one of the one or more broadcast messages is indicative of current network congestion levels.

11. The method according to claim 1, further comprising determining one or more regions in which at least one of the one or more M2M wireless devices are expected to be, and wherein transmitting said one of the broadcast messages comprises transmitting selectively in said determined one or more regions.

12. The method according to claim 11, wherein determining said one or more regions comprises actively tracking locations of target M2M wireless devices.

13. The method according to claim 1, further comprising adjusting a quality of service level based at least in part on current network conditions, reliability requirements of an application communicating via the broadcast messages, or both, wherein said quality of service level affects reliability of transmission of said one or more broadcast messages.

14. The method according to claim 13, wherein said quality of service level defines one or more of: a number of times said broadcast messages are repeated; and conditions under which said broadcast messages are repeated.

15. The method according to claim 13, wherein said quality of service level defines whether M2M wireless devices are required to transmit acknowledgements in response to receiving said broadcast messages addressed thereto.

16. The method according to claim 1, further comprising transmitting an acknowledgement from at least one of the M2M wireless devices in response to receipt of one of the broadcast messages and determining an action to take based on receipt of acknowledgements from said at least one of the M2M wireless devices.

17. The method according to claim 16, wherein transmission of said one of the broadcast messages is conditionally repeated based on a number of acknowledgements received by the remote server.

18. The method according to claim 17, wherein transmission of said one of the broadcast messages is repeated if the number of acknowledgements is below a predetermined threshold.

19. The method according to claim 1, wherein the broadcast messages are encrypted, and wherein every $k^{th}$ broadcast message contains a new nonce for use in decrypting a subsequent k broadcast messages, the method further comprising adjusting k based at least in part on current network conditions.

20. The method according to claim 1, further comprising including a message header in at least one of the broadcast messages, the message header indicative of which of the M2M wireless devices is being addressed, wherein each one of the M2M wireless devices in receipt of the at least one of the broadcast messages is configured to further process the at least one of the broadcast messages if and only if said one of the M2M wireless devices is being addressed,
wherein the message header comprises a group address specific to an application running commonly on plural M2M wireless devices.

21. A method for managing machine-to-machine (M2M) wireless devices from a remote server, the method comprising:
configuring and controlling one or more M2M wireless devices at least in part using one or more broadcast messages transmitted over a wireless communication link; and
transmitting an acknowledgement from at least one of the one or more M2M wireless devices in response to receipt of one of the broadcast messages, wherein said one of the broadcast messages contains a parameter for use by the at least one of one or more M2M wireless devices, said parameter indicative that the at least one of the one or more M2M wireless devices is to delay transmitting said acknowledgement until an earliest occurrence of: expiry of a predetermined maximum amount of time; and
initiation of communication by an application operating on the at least one of the one or more M2M wireless devices.

22. A method for managing machine-to-machine (M2M) wireless devices from a remote server, the method comprising:
configuring and controlling one or more M2M wireless devices at least in part using one or more broadcast messages transmitted over a wireless communication link; and
selecting between a broadcast communication option and a unicast communication option, said selection based at least in part on an assessment or relative efficiency of the broadcast communication option and the unicast communication option,
wherein the broadcast communication option comprises communicating with the one or more M2M wireless devices using the one or more broadcast messages and wherein the unicast communication option comprises communicating with the one or more M2M wireless devices using one or more unicast messages.

23. The method according to claim 19, further comprising, upon determining that at least one of said M2M wireless devices has failed to transmit said acknowledgement, selecting between a broadcast communication option and a unicast communication option for retransmitting content of the broadcast message to said at least one of said M2M wireless devices, and retransmitting content of the broadcast message using the selected option.

24. A method for managing access to a wireless network by a machine-to-machine (M2M) wireless device, the method comprising:
defining a set of network access rules for potential use in governing network access operations performed by the M2M wireless device;
defining a set of service classes, wherein each service class is associated with a particular subset of the set of network access rules; and upon receiving a request by an application running on the M2M wireless device for accessing the wireless network, determining a service class associated with the application, and accessing the network in accordance with the determined service class and the subset of network access rules associated with the determined service class;

wherein at least one of said network access rules is associated with a random back-off time parameter, wherein the M2M wireless device is configured to wait a random amount of time before performing network access operations, and wherein said random amount of time is determined based at least in part on the random back-off time parameter.

25. The method according to claim 24, wherein the plurality of service classes includes a default service class, and wherein determining the service class comprises selecting the default service class when an association between the application and a particular one of the set of service classes is otherwise unspecified.

26. The method according to claim 24, wherein the plurality of service classes includes an override service class, wherein accessing the network is additionally performed in accordance with the subset of network access rules associated with the override service class.

27. The method according to claim 24, wherein at least one of said network access rules is associated with a maximum wait time parameter, wherein the M2M wireless device is configured to wait no longer than the maximum wait time before performing network access operations.

28. A system comprising a server and a plurality of machine-to-machine (M2M) wireless devices, wherein the server is communicatively coupled to the plurality of M2M devices at least in part via a broadcast wireless communication link, and wherein the M2M devices are configured and controlled via broadcast messages transmitted over the broadcast wireless communication link, and wherein the system is further configured to transmit an acknowledgement from at least one of the M2M wireless devices in response to receipt of one of the broadcast messages, wherein said one of the broadcast messages contains a parameter for use by the at least one of the M2M wireless devices in randomizing timing of transmission of said acknowledgement.

29. The system according to claim 28, further comprising an M2M access portal configured to determine said one or more regions comprises by actively tracking locations of target M2M wireless devices.

30. A machine-to-machine (M2M) wireless device comprising:
  a memory comprising a set of network access rules for potential use in governing network access operations performed by the M2M wireless device, and a set of service classes, wherein each service class is associated with a particular subset of the set of network access rules; and
  a network access module configured to: receive a request by an application running on the M2M wireless device for accessing the wireless network; determine a service class associated with the application; and access the network in accordance with the determined service class and the subset of network access rules associated with the determined service class;

wherein at least one of said network access rules is associated with a random back-off time parameter, wherein the M2M wireless device is configured to wait a random amount of time before performing network access operations, and wherein said random amount of time is determined based at least in part on the random back-off time parameter.

31. A non-transitory computer readable medium comprising a computer program product configured for managing machine-to-machine (M2M) wireless devices from a remote server, the computer program product comprising code which, when loaded into memory and executed on an associated processor, is adapted to perform:
  configuring and controlling one or more M2M wireless devices at least in part using one or more broadcast messages transmitted over a wireless communication link; and
  transmitting an acknowledgement from at least one of the M2M wireless devices in response to receipt of one of the broadcast messages, wherein said one of the broadcast messages contains a parameter for use by the at least one of the M2M wireless devices in randomizing timing of transmission of said acknowledgement.

32. A non-transitory computer readable medium comprising a computer program product configured for managing access to a wireless network by a machine-to-machine (M2M) wireless device, the computer program product comprising code which, when loaded into memory and executed on an associated processor, is adapted to perform:
  defining a set of network access rules for potential use in governing network access operations performed by the M2M wireless device;
  defining a set of service classes, wherein each service class is associated with a particular subset of the set of network access rules;
  upon receiving a request by an application running on the M2M wireless device for accessing the wireless network, determining a service class associated with the application, and accessing the network in accordance with the determined service class and the subset of network access rules associated with the determined service class;

wherein at least one of said network access rules is associated with a random back-off time parameter, wherein the M2M wireless device is configured to wait a random amount of time before performing network access operations, and wherein said random amount of time is determined based at least in part on the random back-off time parameter.

* * * * *